US008550560B2

(12) United States Patent
Moriyama et al.

(10) Patent No.: US 8,550,560 B2
(45) Date of Patent: Oct. 8, 2013

(54) SEAT RECLINING APPARATUS FOR VEHICLE

(75) Inventors: Genta Moriyama, Anjo (JP); Hideki Fujisawa, Hekinan (JP); Masaharu Nakamura, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 62 days.

(21) Appl. No.: 13/247,018

(22) Filed: Sep. 28, 2011

(65) Prior Publication Data

US 2012/0074750 A1 Mar. 29, 2012

(30) Foreign Application Priority Data

Sep. 28, 2010 (JP) ................................. 2010-216667

(51) Int. Cl.
*B60N 2/20* (2006.01)

(52) U.S. Cl.
USPC ................................ 297/378.12; 297/354.12

(58) Field of Classification Search
USPC ............... 297/362.11, 366, 362, 374, 354.12, 297/354.1, 483, 378.12
See application file for complete search history.

(56) References Cited

U.S. PATENT DOCUMENTS

| 4,872,726 A | * | 10/1989 | White et al. | 297/367 R |
|---|---|---|---|---|
| 6,371,557 B1 | * | 4/2002 | Holloway | 297/367 R |
| 6,435,616 B1 | * | 8/2002 | Travis et al. | 297/378.12 |
| 2008/0238172 A1 | * | 10/2008 | Maeda et al. | 297/362 |
| 2011/0260516 A1 | * | 10/2011 | Li | 297/354.12 |

FOREIGN PATENT DOCUMENTS

JP 2009-201663 9/2009

* cited by examiner

*Primary Examiner* — David Dunn
*Assistant Examiner* — Timothy J Brindley
(74) *Attorney, Agent, or Firm* — Oblon, Spivak, McClelland, Maier & Neustadt, L.L.P.

(57) ABSTRACT

A seat reclining apparatus for a vehicle, includes the pair of lower arms each connected to the lower side frame, the upper arm positioned between the pair of lower arms and fixedly attached to the upper side frame, the pair of recliners joined to the upper arm and to the pair of lower arms, the electric motor, the lower side frame provided as a pair for sandwiching the pair of lower arms and connected to the pair of lower arms in a manner that the pair of lower arms is pivotable relative to the lower side frame, and a lock member for engaging with the pair of lower side frames and with the pair of lower arms for restricting a relative pivoting movement between the pair of lower side frames and the pair of lower arms in a state where a relative pivot angle therebetween is at a predetermined angle.

8 Claims, 7 Drawing Sheets

SEAT RECLINING APPARATUS FOR VEHICLE

CROSS REFERENCE TO RELATED APPLICATIONS

This application is based on and claims priority under 35 U.S.C. §119 to Japanese Patent Application 2010-216667, filed on Sep. 28, 2010, the entire content of which is incorporated herein by reference.

TECHNICAL FIELD

This disclosure generally relates to a seat reclining apparatus for a vehicle.

BACKGROUND DISCUSSION

A known seat reclining apparatus for a vehicle is disclosed in JP2009-201663A (hereinafter referred to as Patent reference 1). According to the known seat reclining apparatus for the vehicle, a pair of known recliners is provided at a seatback so as to be arranged at a side, in a width direction of a seat for the vehicle, at which a shoulder belt anchor is provided and to which a large load is applied in case of, for example, a vehicle collision. Thus, strength is assured against the large load applied to the seatback. A drive source (an electric motor) is connected to the recliners for driving the recliner to allow lower arms and upper arms, which are connected to the recliners, to pivot relative to each other. The lower arms are fixedly attached to a lower side frame constituting a framework of a seat cushion and the upper arms are fixedly attached to an upper side frame constituting a framework of the seatback. Thus, a tilt angle of the seatback relative to the seat cushion may be changed.

According to the above-explained known seat reclining apparatus for the vehicle, the electric motor is generally used as the drive source and provides a constant driving speed. The driving speed of the electric motor may be appropriate for the adjustments of the tilt angle of the seatback relative to the seat cushion. However, for example, when a passenger on a rear seat of the vehicle egresses the vehicle via a door positioned in a vicinity of a front portion of the vehicle by tilting the seatback to a large extent, which is positioned to be a partition between a front seat and the rear seat, the passenger may find the driving speed of the electric motor rather slow. In addition, the seat reclining apparatus for the vehicle is essentially expected to have an adequate load resistance performance.

A need thus exists for a seat reclining apparatus for a vehicle, which is not susceptible to the drawback mentioned above.

SUMMARY

According to an aspect of this disclosure, a seat reclining apparatus for a vehicle includes a pair of first arms each of which is connected to a first frame constituting a framework of one of a seat cushion and a seatback at one side of a seat for the vehicle in a seat width direction, a second arm positioned between the pair of first arms and fixedly attached to a second frame constituting a framework of the other one of the seat cushion and the seatback, a pair of recliners joined to the second arm and to the pair of first arms in a manner that each of the pair of recliners is sandwiched by the second arm and by corresponding one of the pair of first arms, a drive source for causing the first arm and the second arm to pivot relative to each other for changing a tilt angle of the seatback relative to the seat cushion, the first frame being provided as a pair for sandwiching the pair of first arms and being connected to the pair of first arms in a manner that the pair of first arms is pivotable relative to the first frame about an axis identical to an axis of the pair of recliners, and a lock member for engaging with the pair of first frames and with the pair of first arms for restricting a relative pivoting movement between the pair of first frames and the pair of first arms in a state where a relative pivot angle between the first frame and the first arm is at a predetermined angle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
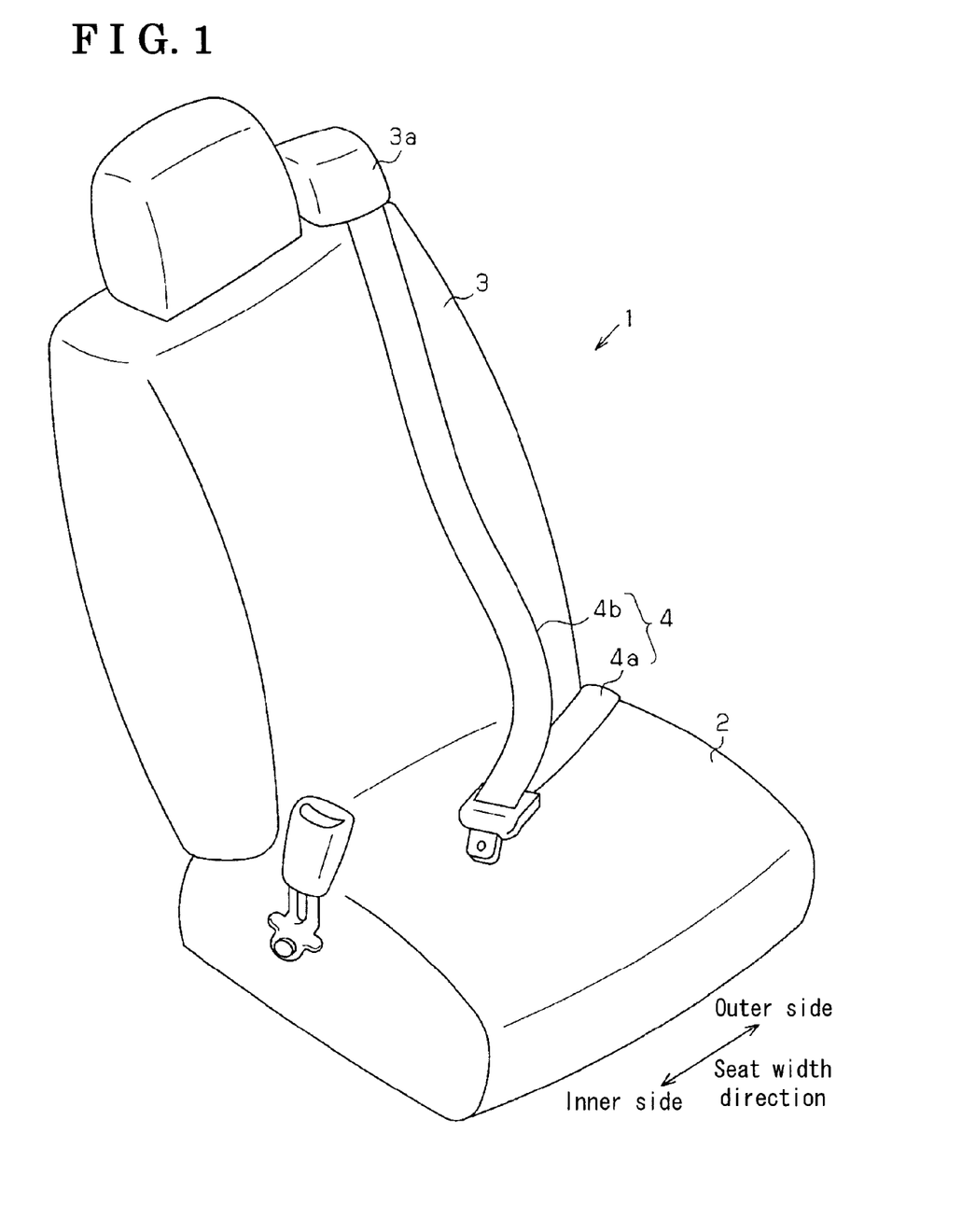
FIG. 1 is a perspective view of a seat for a vehicle according to a first embodiment disclosed here.

A seat reclining apparatus for a vehicle of a first embodiment will be explained with reference to FIGS. 1 to 5. As shown in FIG. 1, a seat cushion 2, which is configured to be attached to a floor of the vehicle, supports a seatback 3 at a rear end portion of the seat cushion 2. A shoulder belt anchor 3a is provided at an upper left portion of the seatback 3 in a seat width direction when seen from an occupant seated on the seat cushion 2. The shoulder belt anchor 3a holds a seat belt 4 wound around a take-up device including, for example, an ELR (Emergency Locking Retractor) provided inside the seatback 3. The seat belt 4 includes a lap belt 4a supporting a lumber portion of the occupant and a shoulder belt 4b supporting an upper body of the occupant. The shoulder belt anchor 3a holds the shoulder belt 4b (an end portion of a dispensed portion of the shoulder belt 4b). A seat 1 for the vehicle supports the occupant at three points, that is, at a left portion and a right portion of the lumber portion of the occupant, and a left shoulder of the occupant, by means of the seat belt 4 dispensed from the shoulder belt anchor 3a. Thus, the seat 1 for the vehicle of this embodiment is a so-called a seat with a three-point-belt (a seat having a built-in belt). A front direction, a rear direction, a vertical direction, a lateral (left/right) direction and derivatives thereof refer to those of the seat 1.

According to the first embodiment, one side in the seat width direction, at which the shoulder belt anchor 3a is positioned, is located at an exterior side (also referred to as an outer side) that faces a vehicle body (for example, a vehicle door). When the occupant seated on the seat 1 is made to lean forward forcefully during, for example, a vehicle collision, a large load in a direction in which the occupant leans forward is applied to the seatback 3 via the seat belt 4 (the shoulder belt 4b) restricting the occupant. The large load is applied to the seatback 3, in a vicinity where the shoulder belt anchor 3a is provided, that is, at the outer side in the seat width direction.

Figure 2:
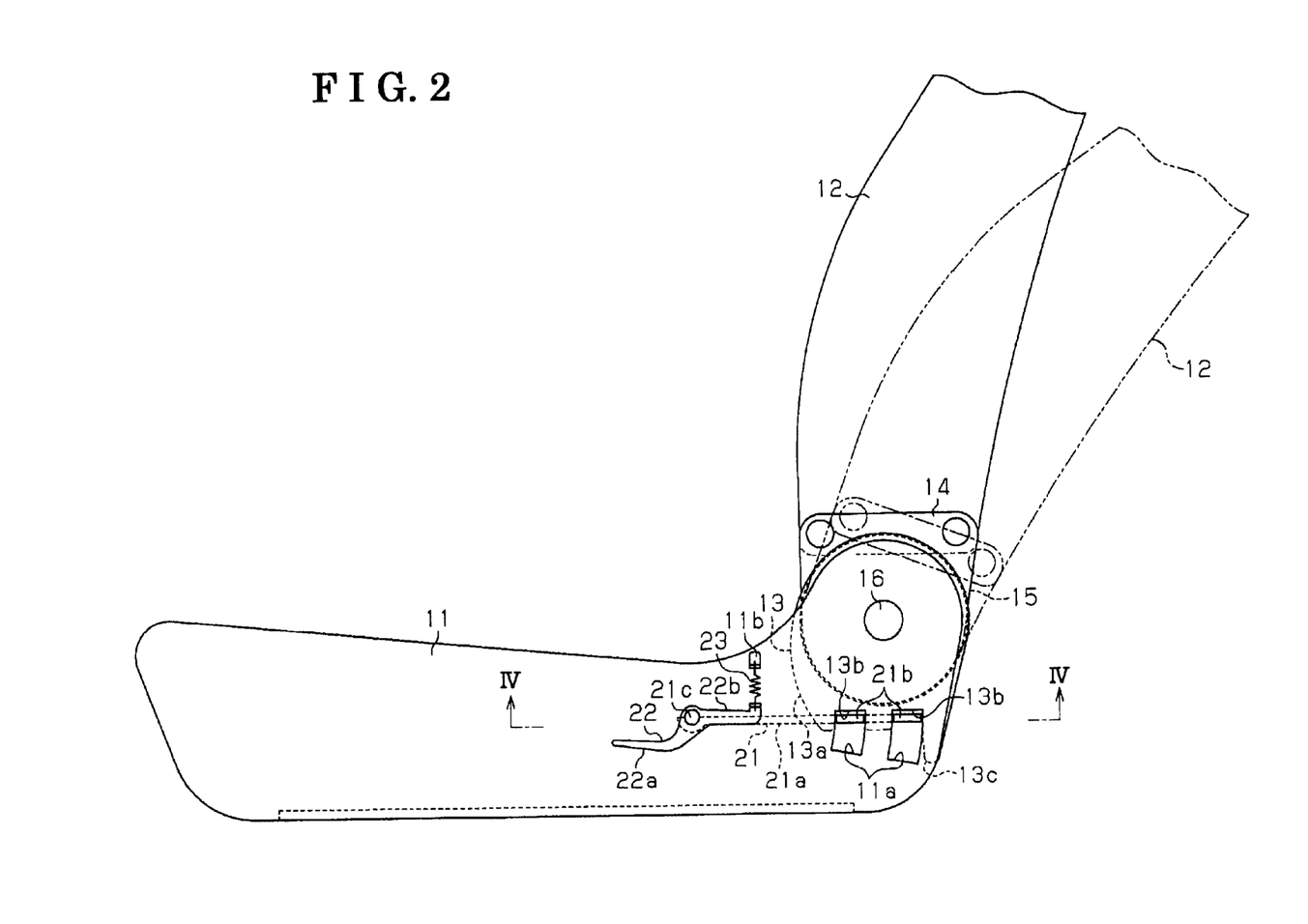
FIG. 2 is a side view illustrating a framework of the seat for the vehicle according to the first embodiment.

As shown in FIG. 2 illustrating a framework of the seat 1 for the vehicle (a seat reclining apparatus for a vehicle) of the first embodiment, a lower side frame 11 (i.e., a first frame) constituting a framework of the seat cushion 2 (refer to FIG. 1) is provided at a lower portion of the seat 1 and an upper side frame 12 (i.e., a second frame) constituting a framework the seatback 3 (refer to FIG. 1) is provided above a rear end of the lower side frame 11.

Figure 3:
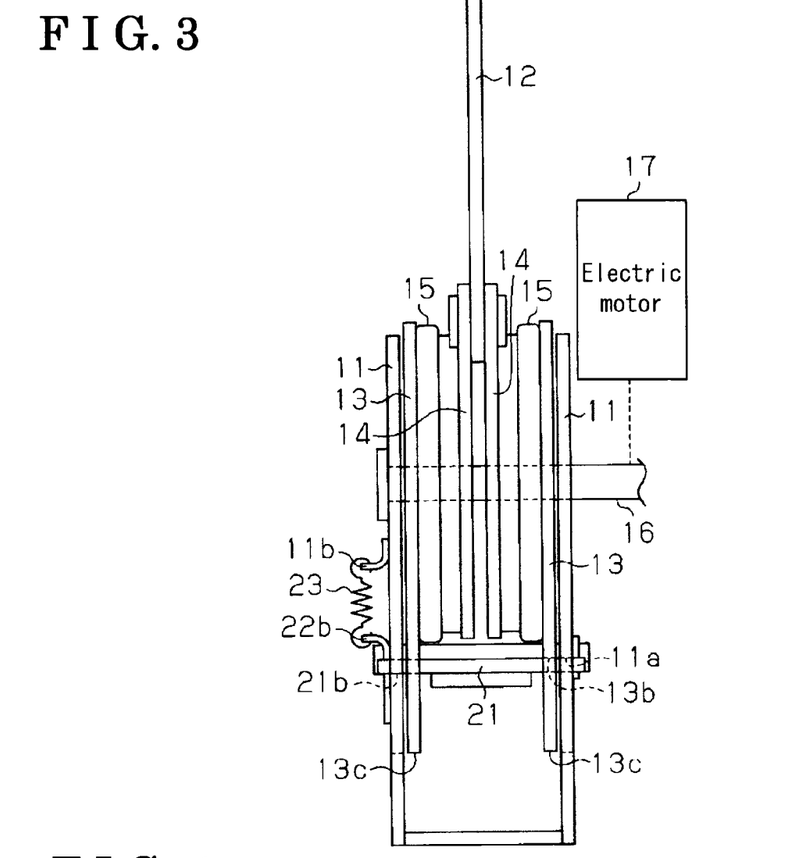
FIG. 3 is a rear view illustrating a part of the framework of the seat for the vehicle according to the first embodiment.

As shown in FIG. 2, at the side where the shoulder belt anchor 3a is provided, a pair of lower arms 13, 13 (i.e., a pair of first arms) is connected to the lower side frame 11 and a pair of upper arms 14, 14 (i.e., a second arm), which is arranged so as to be sandwiched between the pair of lower arms 13, 13, is fixedly connected to the upper side frame 12. As shown in FIG. 3, a pair of recliners 15, 15 is joined to the pair of upper arms 14, 14 and to the pair of lower arms 13, 13 in a manner that each of the pair of recliners 15, 15 is sandwiched by corresponding one of the pair of upper arms 14, 14, which is positioned in a middle in the seat width direction, and by corresponding one of the pair of lower arms 13, 13. The recliner 15 is a known gear-type recliner. At an opposite side in the seat width direction where the shoulder belt anchor 3a is not provided, that is, an inner side in the seat width direction, a single lower arm, a single upper arm and a single recliner are provided.

The pair of recliners 15, 15 provided at the side where the shoulder belt anchor 3a is positioned (the outer side in the seat width direction) and the single recliner provided at the opposite side (the inner side in the seat width direction) are connected with each other by a shaft 16 (refer to FIG. 3). While the shaft 16 is driven and rotated by an electric motor 17 (i.e., a drive source) attached, for example, to the single upper arm provided at the inner side, the pair of lower arms 13, 13 and the pair of upper arms 14, 14, both of which are connected to the pair of recliner 15, 15, pivot relative to each other. Thus, as indicated in a two-dot chain line in FIG. 2, the occupant may change a tilt angle of the upper side frame 12 (the seatback 3) relative to the lower side frame 11 (the seat cushion 2) by, for example, actuating the electric motor 17 through manipulation of an operation device.

As shown in FIG. 3, the lower side frame 11 is provided as a pair so as to sandwich the pair of lower arms 13, 13, and is supported by the shaft 16. Thus, the pair of lower side frames 11, 11 is connected to the pair of lower arms 13, 13 in a manner that the pair of lower arms 13, 13 pivots relative to the pair of lower side frames 11, 11 about an axis identical to an axis of the pair of recliners 15, 15. In the first embodiment, the pair of lower side frames 11, 11 pivotably supports the shaft 16 connected to the pair of recliners 15, 15, and therefore the pair of lower side frames 11, 11 and the pair of lower arms 13, 13 are connected with each other so as to be pivotable relative to each other about the axis identical to the axis of the pair of recliners 15, 15.

The seat reclining apparatus for the vehicle of the first embodiment also includes a lock member 21. The lock member 21 restricts a relative pivoting movement between the pair of lower side frames 11, 11 and the pair of lower arms 13, 13 by engaging with the pair of lower side frames 11, 11 and with the pair of lower arms 13, 13 in a state where a relative pivot angle between the pair of lower side frames 11, 11 and the pair of lower arms 13, 13, that is, an angle made by each of the pair of lower side frames 11, 11 and each of the pair of lower arms 13, 13, is at a predetermined angle (refer to FIG. 2).

Specifically, each side frame 11 includes an engaged hole 11a formed below a portion where the recliner 15 is positioned. The engaged hole 11a is formed into a sector shape, specifically, an annular sector shape, in a manner that a center of the sector shape coincides with a center of a pivot axis of the lock member 21 and that an arc of the sector shape extends in the substantially vertical direction. According to the first embodiment, each side frame 11 includes two of the engaged holes 11a formed into the sector shape having the identical center that coincides with the center of the pivot axis of the lock member 21 and the sector shapes are positioned leaving different distances from the identical center.

As shown in FIG. 2, each lower arm 13 includes an outer extending portion 13a formed so as to protrude from an outer peripheral portion of the recliner 15 outwardly in a radial direction of the recliner 15 when seen along the axial direction of the recliner 15 (the shaft 16). An engaged cutout portion 13b is formed at an end of the outer extending portion 13a by cutting out a portion of the end of the outer extending portion 13a toward the recliner 15. The engaged cutout portion 13b is formed into a shape which opens downwardly and which coincides with a shape of an upper portion of the engaged hole 11a in a state where the relative pivot angle between the pair of lower side frames 11, 11 and the pair of lower arms 13, 13 is at the predetermined angle (refer to FIG. 2). According to the first embodiment, each outer extending portion 13a includes two of the engaged cutout portions 13b.

Figure 4:
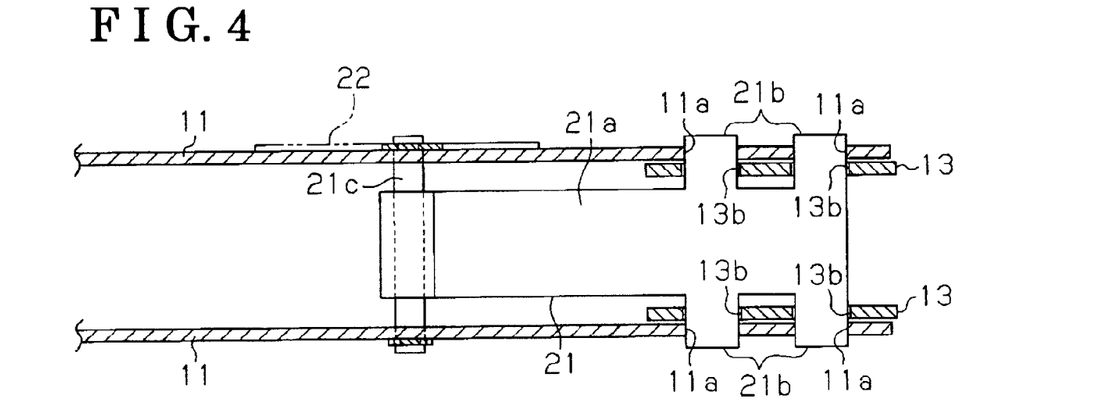
FIG. 4 is a cross section view cut along line IV-IV in FIG. 2.

As shown in FIGS. 2 to 4, the lock member 21 includes a pivot portion 21a supported by the pair of lower side frames 11, 11 so as to be pivotable relative to the pair of lower side frames 11, 11 and an engaging portion 21b provided at the pivot portion 21a. Thus, when the pivot portion 21a is pivoted in a state where the relative pivot angle between the pair of lower side frames 11, 11 and the pair of lower arms 13, 13 is at the predetermined angle, the engaging portion 21b engages with the pair of lower side frames 11, 11 and with the pair of lower arms 13, 13. The lock member 21 of the first embodiment is made of a metal plate member where the pivot portion 21a and the engaging portion 21b are integrally formed into one piece (refer to FIG. 4). A pivot shaft 21c is provided at a front end portion of the pivot portion 21a and both end portions of the pivot shaft 21c in the seat width direction are pivotably supported by the pair of lower side frames 11, 11. The pivot portion 21a is positioned between the pair of lower side frame 11, 11. According to the first embodiment, the lock member 21 includes two of the engaging portions 21b. Each engaging portion 21b is formed at a rear end portion of the pivot portion 21a so as to protrude laterally in both directions relative to the seat width direction and so as to be inserted into the corresponding engaged hole 11a, that is, each engaging portion 21b is formed to be wider in the seat width direction than the pivot portion 21a. When the pivot portion 21a is pivoted in a state where the relative pivot angle between the pair of lower side frames 11, 11 and the pair of lower arms 13, 13 is at the predetermined angle, the engaging portions 21b of the lock member 21 move upward and are engageable with the engaged holes 11a and with the engaged cutout portions 13b relative to the front/rear direction (a direction in which the pair of lower arms 13, 13 and the pair of lower side frames 11, 11 pivot relative to each other).

An operation lever 22 is fixedly attached to one of axial ends, of the pivot shaft 21c, which protrude laterally in both directions relative to the seat width direction beyond the pair of lower side frames 11, 11. The operation lever 22 includes a handle 22a and a spring holding portion 22b. A spring 23 is connected to the spring holding portion 22b of the operation lever 22 and to a spring holding portion 11b provided at the corresponding lower side frame 11. The spring 23 biases the spring holding portions 22b and 11b in a direction that the spring holding portions 22b and 11b become closer to each other, that is, in the direction that the engaging portions 21b are moved upward so as to be engaged with the engaged holes 11a and with the engaged cutout portions 13b.

The outer extending portion 13a of each lower arm 13 includes a restricting protrusion 13c formed behind the engaged cutout portions 13b so as to protrude significantly further than the other portion of the outer extending portion 13a. While the operation lever 22 is pulled and thus the engaging portions 21b are moved downwardly (to a lowest position), the restricting protrusion 13c comes into contact with the corresponding engaging portion 21b, thereby restricting the upper side frame 12 from tilting rearward.

Figure 5:
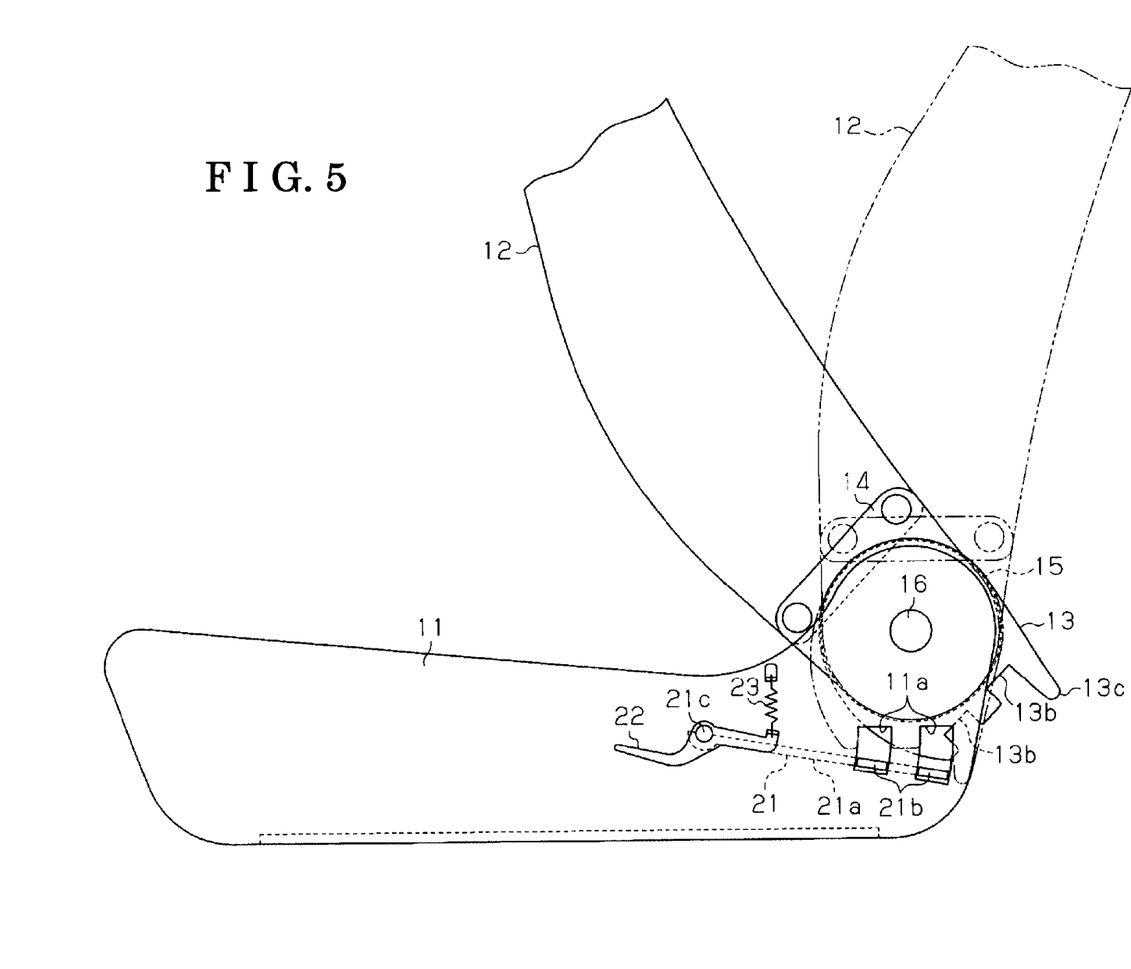
FIG. 5 is a side view illustrating the framework of the seat for the vehicle according to the first embodiment.

According to the seat reclining apparatus for the vehicle including the above-explained structure, the relative pivoting movement between the pair of lower side frames 11, 11 and the pair of lower arms 13, 13 is restricted in a state where the engaging portions 21b engage with the engaged holes 11a and with the engaged cutout portions 13b. When the operation lever 22 is pulled against a biasing force of the spring 23 in the above-mentioned state, the engaging portions 21b move downwardly, and thus disengage from the engaged cutout portions 13b. This allows the relative pivoting movement between the pair of lower side frames 11, 11 and the pair of lower arms 13, 13 (refer to FIG. 5). In the first embodiment, however, the pivoting movement of the pair of lower side frames 11, 11 and the pair of lower arms 13, 13 (the relative pivoting movement between the lower side frame 11 and the lower arm 13) is allowed only in a direction in which the upper side frame 12 (the seatback 3) tilts forward relative to the seat cushion 2 because the restricting protrusion 13c is formed at the lower arm 13. The pivoting movement of the pair of lower side frames 11, 11 and the pair of lower arms 13, 13 (the relative pivoting movement between the lower side frame 11 and the lower arm 13) in a direction in which the upper side 12 (the seatback 3) tilts rearward relative to the seat cushion 2 is restricted by the restricting protrusion 13c. In this state where the pivoting movement of the pair of lower arms 13, 13 relative to the pair of lower side frames 11, 11 is allowed in the direction in which the upper side frame 12 (the seatback 3) tilts forward relative to the seat cushion 2, when the seatback 3 (refer to FIG. 1) is pushed so as to tilt forward, the pair of lower arms 13, 13 pivots relative to the pair of lower side frames 11, 11 and the upper side frame 12 (the seatback 3) largely tilts forward as shown in FIG. 5. After that, when the seatback 3 largely tilted forward is raised upward in a state where the operation lever 22 is not pulled, the engaging portions 21b are moved upward by the biasing force of the spring 23 and are received by the engaged cutout portions 13b when the relative pivot angle between the pair of lower side frame 11, 11 and the pair of lower arms 13, 13 comes to be at the predetermined angle as shown in FIGS. 2 to 4. Accordingly, the engaging portions 21b engage with the engaged holes 11a and with the engaged cutout portions 13b. Thus, the relative pivoting movement between the pair of lower side frames 11, 11 and the pair of lower arms 13, 13 is restricted. The predetermined angle refers to an angle at which positions of the engaged holes 11a coincide with positions of the corresponding engaged cutout portions 13b.

Next, characteristic operation and effects of the first embodiment will be explained hereunder. (1) The lower side frame 11 is provided as a pair so as to sandwich the pair of lower arms 13, 13, and are connected to the pair of lower arms 13, 13 in a manner that the pair of lower arms 13, 13 pivots relative to the pair of lower side frames 11, 11 about the axis identical to the axis of the pair of recliners 15, 15. The seat reclining apparatus for the vehicle is provided with the lock member 21 for restricting the relative pivoting movement between the pair of lower side frames 11, 11 and the pair of lower arms 13, 13 by engaging with the pair of lower side frames 11, 11 and with the pair of lower arms 13, 13 in a state where the relative pivot angle between the pair of lower side frames 11, 11 and the pair of lower arms 13, 13 is at the predetermined angle. Thus, the tilt angle of the seat cushion 2 relative to the seatback 3 may be changed quickly by releasing the restriction on the relative pivoting movement. As a result, in such a situation where, for example, the seatback 3 is positioned to be a partition between a front seat and a rear seat of the vehicle, the seatback 3 may be tilted quickly, thereby allowing the passenger on the rear seat to quickly egress the vehicle via the door positioned in a vicinity of the front portion of the vehicle.

In addition, because the lower side frame 11 is provided as a pair so as to sandwich the pair of lower arms 13, 13, and the lock member 21 engages with the pair of lower side frames 11, 11 and with the pair of lower arms 13, 13, even in case that the large load is applied to the seatback 3, the large load may be received by the pair of lower side frames 11, 11, the pair of lower arms 13, 13 and the two recliners 15, 15 favorably, that is, in a balanced manner. In other words, in case that the lower side frame is not provided as a pair in a manner that the pair of lower arms is sandwiched by the pair of lower side frames, or in case that the lock member engages with only one of the pair of the lower arms, torsion may be generated. Accordingly, the load on the seatback may be applied to the two recliners unevenly, or a plate thickness of the lower arm or the lower side frame may need to be increased in order to receive the torsion. According to the first embodiment, however, the generation of the torsion or a necessity of increasing the plate thickness of the lower arm or the lower side frame may be prevented.

(2) The lock member 21 includes the pivot portion 21a supported by the pair of lower side frames 11, 11 so as to be pivotable relative to the pair of lower side frames 11, 11 and the engaging portion 21b provided at the pivot portion 21a. Thus, when the pivot portion 21a is pivoted in a state where the relative pivot angle between the pair of lower side frames 11, 11 and the pair of lower arms 13, 13 is at the predetermined angle, the engaging portions 21b engage with the pair of lower side frames 11, 11 and with the pair of lower arms 13, 13. Thus, the effects explained in (1) may be achieved by a simple structure. In addition, because the lock member 21 restricts the relative pivoting movement between the pair of lower side frames 11, 11 and the pair of lower arms 13, 13 by allowing the engaging portions 21b to engage with the pair of lower side frames 11, 11 and with the pair of lower arms 13, 13, no large load is applied to the pivot shaft 21c that is supported by the pair of lower side frames 11, 11 in this structure. Thus, a simple structure may be employed for connecting the lock member 21 and the pair of lower side frames 11, 11 (there is no need to employ a connecting structure that withstands a large load).

(3) The lock member 21 includes the metal plate member where the pivot portion 21a and the engaging portions 21b are integrally formed into one piece. Thus, the number of parts may be reduced comparing to a case, for example, where the lock member 21 includes the pivot portion 21a and the engaging portion 21b that are formed separately from each other. In addition, the lock member 21 may easily be formed in, for example, a stamping process.

(4) The pair of recliners 15, 15 is provided at the side in the seat width direction, to which the large load is applied in case of, for example, the vehicle collision and at which the shoulder belt anchor 3a is positioned. Thus, the strength is assured against the large load applied to the seatback 3. According to the first embodiment, the single recliner is provided at the other side in the seat width direction (that is, the side at which the shoulder belt anchor 3a is not positioned), thereby downsizing the seat reclining apparatus as a whole in the seat width direction while assuring the strength.

The first embodiment may be changed or modified as follows. The lock member 21 may include other structures than the one explained above as long as the lock member 21 restricts the relative pivoting movement between the pair of lower side frames 11, 11 and the pair of lower arms 13, 13 by engaging with the pair of lower side frames 11, 11 and with the pair of lower arms 13, 13 in a state where the relative pivot angle between the pair of lower side frames 11, 11 and the pair of lower arms 13, 13 is at the predetermined angle.

For example, in a second embodiment shown in FIGS. 6 to 9, the modification may be added to the lock member 21. As shown in FIGS. 6 to 9, each lower side frame 11 includes an engaged hole 11c formed into a circular arc shape extending in the substantially vertical direction in a manner that a center of an arc of the circular arc shape coincides with a center of a pivot axis of a lock member 31 which will be explained later. According to the second embodiment, each of vertical end portions of the engaged hole 11c is formed into a semicircular shape so as to match an outer peripheral surface of an engaging portion 31a of the lock member 31.

Figure 6:
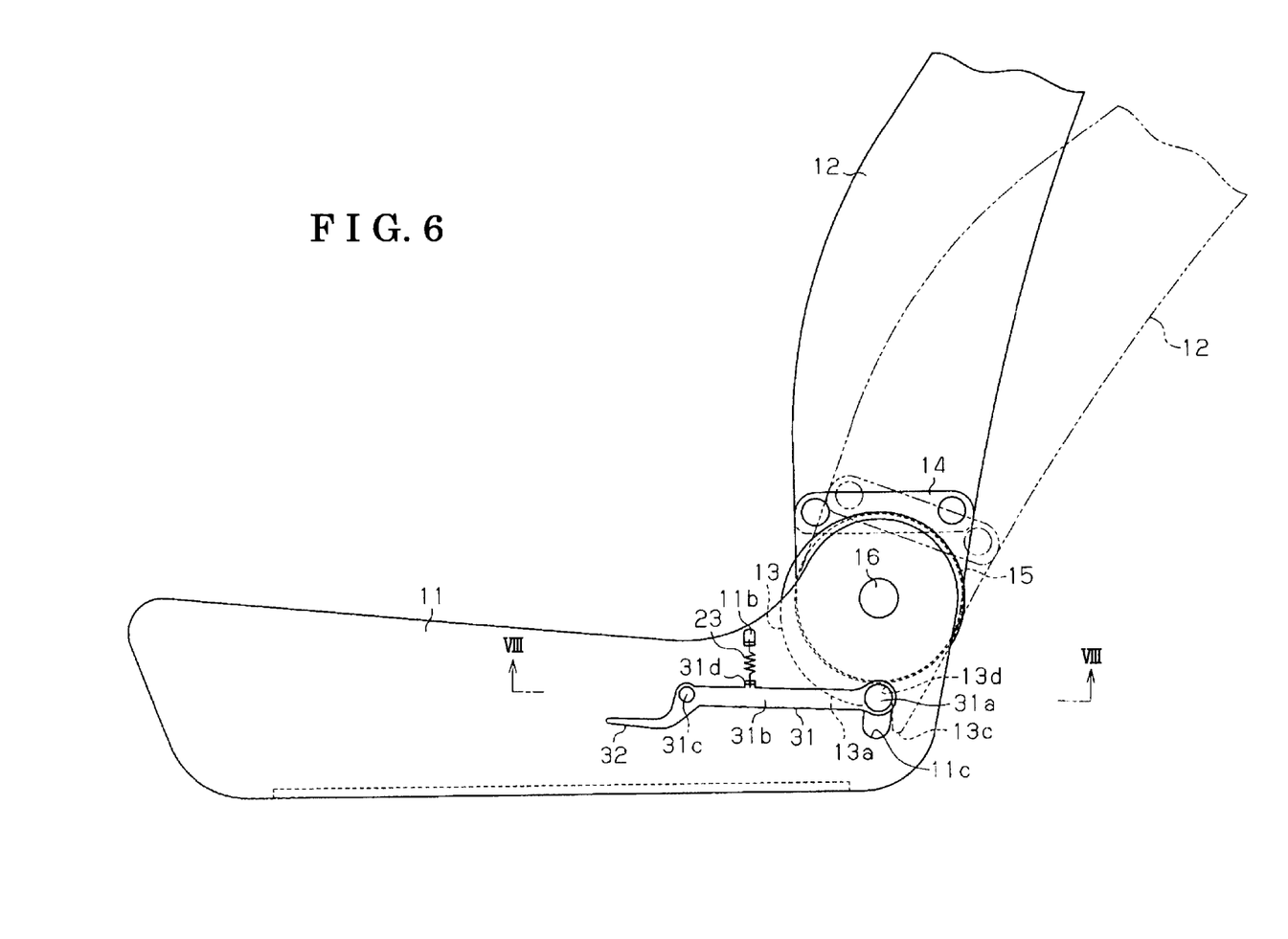
FIG. 6 is a side view illustrating a framework of a seat for a vehicle according to a second embodiment.

According to the second embodiment, each of the pair of lower arms 13, 13 includes an engaged cutout portion 13d formed into a shape which opens downwardly and which matches a shape of an upper portion of the engaged hole 11c in a state where the relative pivot angle between the pair of lower side frames 11, 11 and the pair of lower arms 13, 13 is at the predetermined angle (refer to FIG. 6). As with the first embodiment, in the second embodiment, the outer extending portion 13a of each lower arm 13 includes the restricting protrusion 13c which is formed behind the engaged cutout portion 13d and which performs an identical function to that of the restricting protrusion 13c of the first embodiment.

Figure 7:
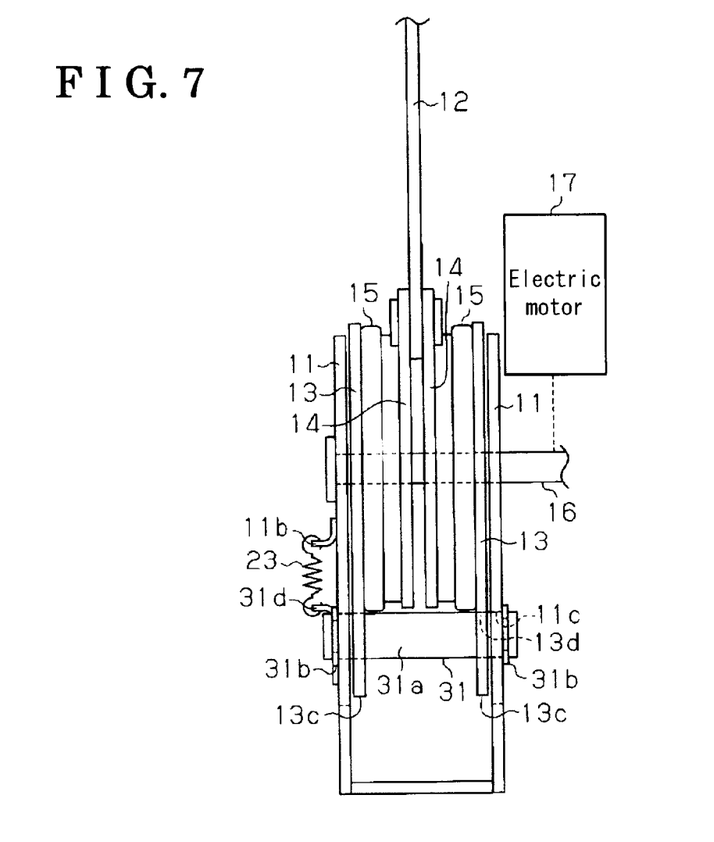
FIG. 7 is a rear view illustrating a part of the framework of the seat for the vehicle according to the second embodiment.
Figure 8:
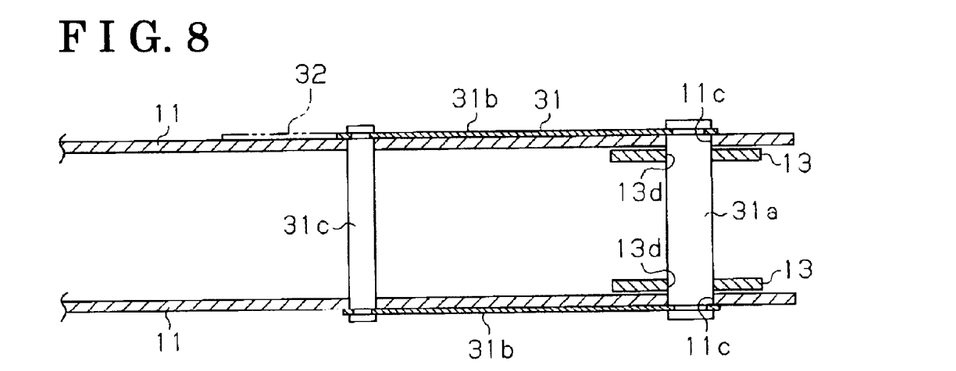
FIG. 8 is a cross section view cut along line VIII-VIII in FIG. 6.

As shown in FIG. 8, the lock member 31 of the second embodiment is a pin having a cylindrical shape, and the engaging portion 31a is fixedly attached to a pivot portion 31b. Specifically, as shown in FIGS. 7 and 8, the lock member 31 includes the pivot portion 31b provided as a pair and positioned at lateral outer surfaces of the pair of lower side frames 11, 11 in the seat width direction, and a pivot shaft 31c pivotably supported by the pair of lower side frames 11, 11 and connecting front end portions of the pair of pivot portions 31b, 31b with each other. The engaging portion 31a constituted by the pin having the cylindrical shape is arranged so as to penetrate the engaged holes 11c and both axial ends of the engaging portion 31a in the seat width direction are fixedly connected to rear end portions of the pivot portions 31b, 31b. In the second embodiment, as shown in FIG. 6, a spring holding portion 31d and an operation lever 32 are integrally formed into one of the pair of pivot portions 31b, 31b.

Figure 9:
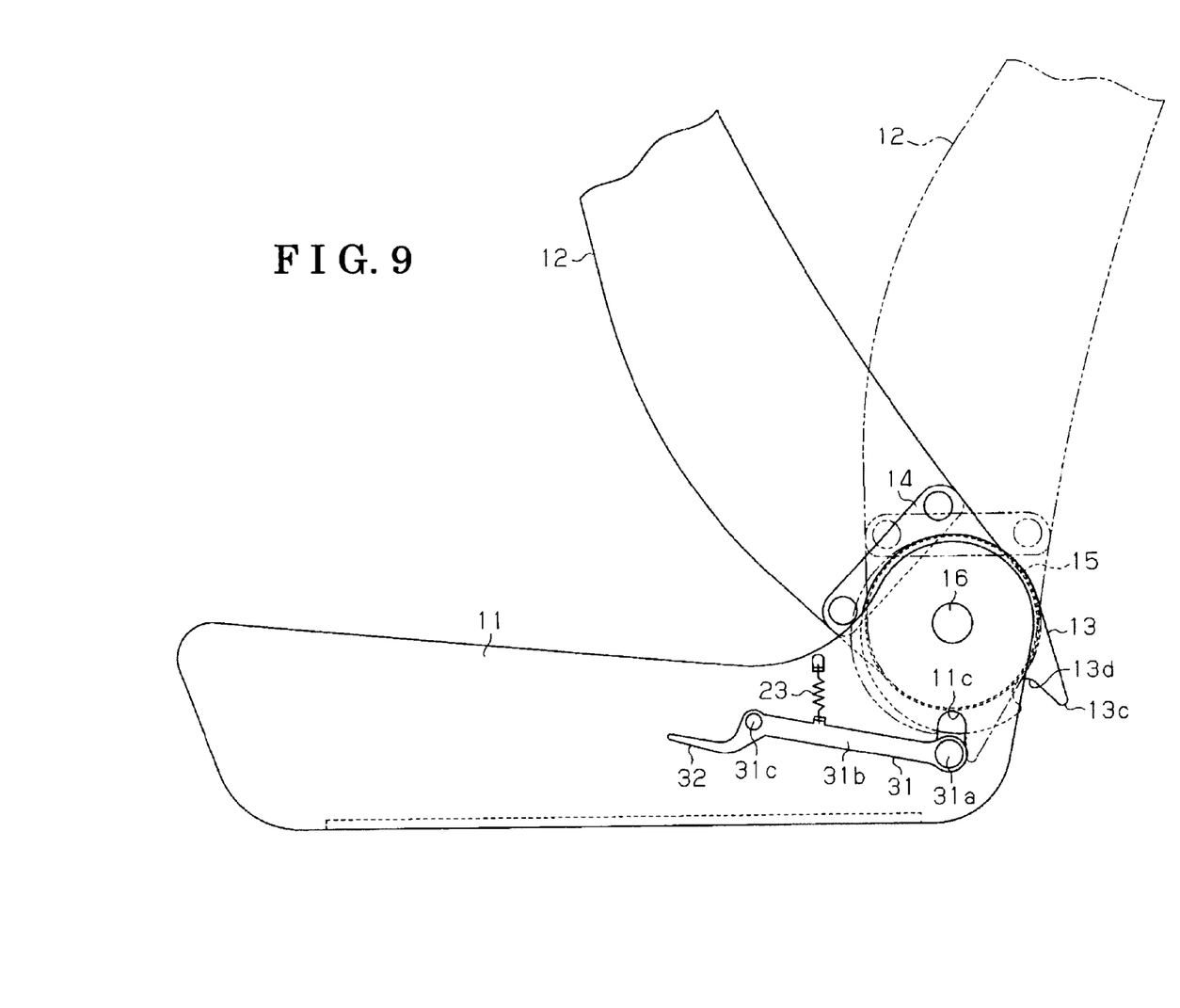
FIG. 9 is a side view illustrating the framework of the seat for the vehicle according to the second embodiment.

According to the seat reclining apparatus for the vehicle including the above-explained structure, the relative pivoting movement between the pair of lower side frames 11, 11 and the pair of lower arms 13, 13 is restricted in a state where the engaging portion 31a engages with the engaged holes 11c and with the engaged cutout portions 13d (refer to FIGS. 6 to 8). When the operation lever 32 is pulled against the biasing force of the spring 23 in the above-mentioned state, the engaging portion 31a is moved downward, and thus disengages from the engaged cutout portions 13d of the pair of lower arms 13, 13. This allows the relative pivoting movement between the pair of lower side frames 11, 11 and the pair of lower arms 13, 13 (refer to FIG. 9). In this state, when the seatback 3 (refer to FIG. 1) is pushed so as to tilt forward, the pair of lower arms 13, 13 pivots relative to the pair of lower side frames 11, 11 and the upper side frame 12 (the seatback 3) largely tilts forward as shown in FIG. 9. After that, when the seatback 3 is raised upward in a state where the operation lever 32 is not pulled, the engaging portion 31a is moved upward by the biasing force of the spring 23 and is received by the engaged cutout portions 13d when the relative pivot angle between the pair of lower side frames 11, 11 and the pair of lower arms 13, 13 comes to be at the predetermined angle as shown in FIGS. 6 to 8. Accordingly, the engaging portion 31a engages with the engaged holes 11c and with the engaged cutout portions 13d. Thus, the relative pivoting movement between the pair of lower side frames 11, 11 and the pair of lower arms 13, 13 is restricted.

According to the seat reclining apparatus for the vehicle of the second embodiment, the characteristic effects identical to those of the first embodiment as stated in (1), (2) and (4) may be obtained. In addition, according to the second embodiment, the lock member 31 is the pin having the cylindrical shape, and engaging portion 31a is fixedly attached to the pivot portions 31b. The outer peripheral surface of the pin may reduce a friction resistance while the engaging portion 31a comes into engagement with the engaged holes 11c and with the engaged cutout portions 13d (that is, while the engaging portion 31a moves vertically), thereby achieving a smooth engagement.

Further, for example, the lock member 21, 31 of the first and the second embodiments include the pivot portion 21a, 31b supported by the pair of the lower side frames 11, 11 so as to be pivotable relative to the pair of lower side frames 11, 11, and the engaging portion 21b, 31a provided at the pivot portion 21a, 31b. However, the lock member 21, 31 may be configured so that the engaging portion 21b, 31a engages with the pair of lower side frames 11, 11 and with the pair of lower arms 13, 13 by allowing the pivot portion 21a, 31b to linearly (vertically) move, instead of pivot, relative to the pair of the lower side frames 11, 11.

According to the first embodiment, each of the pair of side frames 11, 11 includes two of the engaged holes 11a positioned leaving the different distances from the pivot center of the lock member 21 when viewed from the lateral direction. Accordingly, each of the pair of lower arms 13, 13 is formed with the two of the engaged cutout portions 13b and the lock member 21 includes two of the engaging portions 21b. However, the numbers of the engaged hole 11a, the engaged cutout portion 13b and the engaging portion 21b may be one, or three or more respectively.

According to the first and the second embodiments, the first frame is the lower side frame 11 constituting the framework of the seat cushion 2, however, the first frame may be the upper side frame 12 constituting the framework of the seatback 3. Thus, according to the first and the second embodiments, the lower arm 13 and the lower side frame 11 are pivotable relative to each other, and the lock member 21, 31 for restricting the pivoting movement between the lower arm 13 and the lower side frame 11 is provided, however, the upper arm 14 and the upper side frame 12 may be pivotable relative to each other, and the lock member 21, 31 for restricting the pivoting movement between the upper arm 14 and the upper side frame 12 may be provided.

According to the first and the second embodiments, each of the pair of lower arms 13, 13 includes the restricting protrusion 13c for restricting the upper side frame 12 from tilting rearward relative to the seat cushion 2 by coming into contact with the corresponding engaging portion 21b, 31a even in a state where the engaging portion 21b, 31a is pulled by the operation lever 22, 32 and is moved downwardly (to the lowest position). However, the seat reclining apparatus may be configured without including the restricting protrusion 13c. In this case, in a state where the operation lever 22, 32 is pulled, the relative pivoting movement between the pair of lower side frames 11, 11 and the pair of lower arms 13, 13 is allowed in both directions. Consequently the upper side frame 12 (the seatback 3 as shown in FIG. 1) tilts to a large extent rearward when the seatback 3 is pushed co as to tilt rearward.

According to the first and the second embodiments, the pair of recliners 15, 15 is provided at the side, in the seat width direction, at which the shoulder belt anchor 3a is provided and the single recliner is provided at the other side at which the shoulder belt anchor 3a is not provided. However, the pair of recliners 15, 15 may be provided at both sides in the seat width direction.

According to the first and second embodiment, the seat reclining apparatus for the vehicle includes the pair of lower arms 13, 13 each of which is connected to the lower side frame 11 constituting the framework of one of the seat cushion 2 and the seatback 3 at the one side of the seat 1 for the vehicle in the seat width direction, the upper arm 14 positioned between the pair of lower arms 13, 13 and fixedly attached to the upper side frame 12 constituting the framework of the other one of the seat cushion 2 and the seatback 3, the pair of recliners 15, 15 joined to the upper arm 14 and to the pair of lower arms 13, 13 in a manner that each of the pair of recliners 15, 15 is sandwiched by the upper arm 14 and by corresponding one of the pair of lower arms 13, 13, the electric motor 17 for causing the lower arm 13 and the upper arm 14 to pivot relative to each other for changing a tilt angle of the seatback 3 relative to the seat cushion 2, the lower side frame 11 being provided as a pair for sandwiching the pair of lower arms 13, 13 and being connected to the pair of lower arms 13, 13 in a manner that the pair of lower arms 13, 13 is pivotable relative to the lower side frame 11 about the axis identical to the axis of the pair of recliners 15, 15, and the lock member 21, 31 for engaging with the pair of lower side frames 11, 11 and with the pair of lower arms 13, 13 for restricting a relative pivoting movement between the pair of lower side frames 11, 11 and the pair of lower arms 13, 13 in a state where a relative pivot angle between the lower side frame 11 and the lower arm 13 is at a predetermined angle.

According to the above described structure, the lower side frame 1lls provided as a pair so as to sandwich the pair of lower arms 13, 13, and is connected to the pair of lower arms 13, 13 in a manner that the pair of lower arms 13, 13 is pivotable relative to the lower side frame 11 about the axis identical to the axis of the pair of recliners 15, 15. The seat reclining apparatus for the vehicle is provided with the lock member 21, 31 for restricting the relative pivoting movement between the pair of lower side frames 11, 11 and the pair of lower arms 13, 13 by engaging with the pair of lower side frames 11, 11 and with the pair of lower arms 13, 13 in a state where the relative pivot angle between the pair of lower side frames 11, 11 and the pair of lower arms 13, 13 is at the predetermined angle. Thus, the tilt angle of the seat cushion 2 relative to the seatback 3 may be changed quickly by releasing the restriction on the relative pivoting movement. As a result, in such a situation where, for example, the seatback 3 is positioned to be the partition between the front seat and the rear seat of the vehicle, the seatback 3 may be tilted quickly, thereby allowing the passenger on the rear seat to quickly egress the vehicle via the door positioned in a vicinity of the front portion of the vehicle.

Because the lower side frame 11 is provided as a pair so as to sandwich the pair of lower arms 13, 13, and the lock member 21, 31 engages with the pair of lower side frames 11, 11 and with the pair of lower arms 13, 13, even in case that the large load is applied to the seatback 3, the large load may be received by the pair of lower side frames 11, 11, the pair of lower arms 13, 13 and the two recliners 15, 15 favorably, that is, in the balanced manner. In other words, in case that the lower side frame is not provided as a pair in a manner that the pair of lower arms is sandwiched by the pair of lower side frames, or in case that the lock member engages with only one of the pair of the lower arms, the torsion may be generated. Accordingly, the load on the seatback may be applied to the two recliners unevenly, or the plate thickness of the lower arm or the lower side frame may need to be increased in order to receive the torsion. According to the first embodiment, however, the generation of the torsion or a necessity of increasing the plate thickness of the lower arm or the lower side frame may be prevented.

According to the first and second embodiments, the lock member 21, 31 includes the pivot portion 21a, 31b supported by the lower side frame 11 in a manner that the pivot portion 21a, 31b is pivotable relative to the pair of lower side frame 11 and the engaging portion 21b, 31a provided at the pivot portion 21a, 31b. The engaging portion 21b, 31a engages with the pair of lower side frames 11, 11 and with the pair of lower arms 13, 13 when the pivot portion 21a, 31b is pivoted in a state where the relative pivot angle between the lower side frame 11 and the lower arm 13 is at the predetermined angle.

According to the above described structure, aforementioned effects may be achieved by the simple structure. In addition, because the lock member 21 for restricting the relative pivoting movement between the pair of lower side frames 11, 11 and the pair of lower arms 13, 13 by allowing the engaging portions 21b to engage with the pair of lower side frames 11, 11 and with the pair of lower arms 13, 13, no large load is applied to the pivot shaft 21c that is supported by the lower side frame 11 in this structure. Thus, the simple structure may be employed for connecting the lock member 21 and the lower side frame 11 (there is no need to employ the connecting structure that withstands the large load).

According to the first embodiment, the lock member 21 includes the metal, plate member into which the pivot portion 21a and the engaging portion 21b are integrally formed.

According to the above described structure, the number of parts may be reduced comparing to a case, for example, where the lock member 21 includes the pivot portion 21a and the engaging portion 21b that are formed separately from each other. In addition, the lock member 21 may easily be formed in, for example, the stamping process.

According to the second embodiment, the lock member 31 is the pin having the cylindrical shape and the engaging portion 31a is fixedly attached to the pivot portion 31b.

According to the above described structure, the outer peripheral surface of the engaging portion 21b, 31a may reduce the friction resistance while the engaging portion 21b, 31a comes into engagement with engaged portions of the pair of lower side frames 11, 11 and the pair of lower arms 13, 13.

According to the first and second embodiments, the one side of the seat 1 for the vehicle in the seat width direction is the side at which the shoulder belt anchor 3a holding the shoulder belt 4b is provided.

According to the above described structure, the pair of recliners 15, 15 is provided at the one side in the seat width direction, to which the large load is applied in case of, for example, the vehicle collision and at which the shoulder belt anchor 3a is positioned. Thus, the strength is assured against the large load applied to the seatback 3. The single recliner is provided at the other side in the seat width direction (that is, the side at which the shoulder belt anchor 3a is not positioned), thereby downsizing the seat reclining apparatus as a whole in the seat width direction while assuring the strength.

According to the first and second embodiments, each of the pair of lower side frames 11, 11 includes the engaged hole 11a, 11c formed below the portion at which the pair of recliners 15, 15 is positioned, each of the pair of lower arms 13, 13 includes the outer extending portion 13a formed in a manner that the outer extending portion 13a protrudes from the pair of recliners 15, 15, and the outer extending portion 13a includes the engaged cutout portion 13b, 13d formed by cutting out the outer extending portion 13a toward the pair of recliners 15, 15. The predetermined angle is the angle at which the position of the engaged hole 11a, 11c and the position of the engaged cutout portion 13b, 13d coincides with each other.

According to the first embodiment, the engaged hole 11a is formed into the sector shape in a manner that the center of the sector shape coincides with the center of the pivot axis of the lock member 21.

According to the first and second embodiments, the engaged cutout portion 13b, 13d is formed into the shape which opens downwardly and which coincides with the shape of the upper portion of the engaged hole 11a, 11c in a state where the relative pivot angle between the lower side frame 11 and the lower arm 13 is at the predetermined angle.

According to the above described structure, the tilt angle of the seat cushion 2 relative to the seatback 3 may be changed quickly by means of the simple structure.

According to the first and second embodiments, the seat reclining apparatus for the vehicle, which has an adequate load resistance performance and in which the tilt angle of the seatback 3 relative to the seat cushion 2 is quickly changed may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus for a vehicle, comprising:
a first frame constituting a framework of one of a seat cushion and a seatback of a seat for the vehicle, the first frame including a pair of side frames;
a pair of first arms, each being connected to the first frame, the pair of first arms disposed at one side of the seat in a seat width direction;
a second arm positioned between the pair of first arms and fixedly attached to a second frame constituting a framework of the other one of the seat cushion and the seatback;
a pair of recliners joined to the second arm and to the pair of first arms in a manner that each of the pair of recliners is sandwiched by the second arm and by a corresponding one of the pair of first arms;
a drive source that causes the pair of first arms and the second arm to pivot relative to each other to change a tilt angle of the seatback relative to the seat cushion, the drive source being connected to the pair of recliners to drive the pair of recliners; and
a lock member that engages with the pair of side frames of the first frame and with the pair of first arms,
wherein the pair of side frames of the first frame sandwich the pair of first arms and are connected to the pair of first arms in a manner that the pair of first arms is pivotable relative to the first frame about an axis identical to an axis of the pair of recliners, and
wherein the lock member restricts a relative pivoting movement between the pair of side frames of the first frame and the pair of first arms in a state where a relative pivot angle between the first frame and the pair of first arms is at a predetermined angle.

2. The seat reclining apparatus for the vehicle according to claim 1, wherein the lock member includes a pivot portion supported by the first frame in a manner that the pivot portion is pivotable relative to the pair of side frames of first frame and an engaging portion provided at the pivot portion, and
the engaging portion engages with the pair of side frames of the first frame and with the pair of first arms when the pivot portion is pivoted in a state where the relative pivot angle between the first frame and the pair of first arms is at the predetermined angle.

3. The seat reclining apparatus for the vehicle according to claim 2, wherein the lock member includes a metal plate member into which the pivot portion and the engaging portion are integrally formed.

4. The seat reclining apparatus for the vehicle according to claim 2, wherein the lock member is a pin having a cylindrical shape and the engaging portion is fixedly attached to the pivot portion.

5. The seat reclining apparatus for the vehicle according to claim 1, wherein the one side of the seat for the vehicle in the seat width direction is a side at which a shoulder belt anchor holding a shoulder belt is provided.

6. The seat reclining apparatus for the vehicle according to claim 1, wherein each of the pair of side frames of the first frame includes an engaged hole formed below a portion at which the pair of recliners is positioned,
each of the pair of first arms includes an outer extending portion formed in a manner that the outer extending portion protrudes from the pair of recliners and the outer extending portion includes an engaged cutout portion formed by cutting out the outer extending portion toward the pair of recliners, and
the predetermined angle is an angle at which a position of the engaged hole and a position of the engaged cutout portion coincides with each other.

7. The seat reclining apparatus for the vehicle according to claim 6, wherein the engaged hole is formed into a sector shape in a manner that a center of the sector shape coincides with a center of a pivot axis of the lock member.

8. The seat reclining apparatus for the vehicle according to claim 6, wherein the engaged cutout portion is formed into a shape which opens downwardly and which coincides with a shape of an upper portion of the engaged hole in a state where the relative pivot angle between the first frame and the first arm is at the predetermined angle.

* * * * *